United States Patent
Challa et al.

(10) Patent No.: US 11,974,203 B2
(45) Date of Patent: Apr. 30, 2024

(54) ENTERPRISE EMBEDDED SUBSCRIBER IDENTITY MODULE MANAGEMENT

(71) Applicant: T-Mobile USA, Inc., Bellevue, WA (US)

(72) Inventors: Srinivas Challa, Bellevue, WA (US); Sanjay Kharate, Sammamish, WA (US); Manoj Sukumaran, Snohomish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 239 days.

(21) Appl. No.: 17/530,344

(22) Filed: Nov. 18, 2021

(65) Prior Publication Data
US 2023/0156443 A1    May 18, 2023

(51) Int. Cl.
*H04W 8/20* (2009.01)
*H04W 4/50* (2018.01)
*H04W 8/18* (2009.01)
*H04W 24/06* (2009.01)

(52) U.S. Cl.
CPC ............. *H04W 4/50* (2018.02); *H04W 8/183* (2013.01)

(58) Field of Classification Search
None
See application file for complete search history.

(56) References Cited

U.S. PATENT DOCUMENTS

| | | | |
|---|---|---|---|
| 10,791,459 B1 * | 9/2020 | Hu | H04W 8/245 |
| 2018/0352432 A1 * | 12/2018 | Barki | H04L 9/3239 |

FOREIGN PATENT DOCUMENTS

| | | | | |
|---|---|---|---|---|
| CN | 11148088 | * | 5/2020 | |
| CN | 111148088 A | * | 5/2020 | H04L 67/02 |

OTHER PUBLICATIONS

ESIM Whitepaper; The what and how of Remote SIM Provisioning; Mar. 2018; GSMA; 21 pages.

* cited by examiner

*Primary Examiner* — Gary Lafontant
(74) *Attorney, Agent, or Firm* — Lee & Hayes, P.C.

(57) ABSTRACT

Techniques remotely managing an embedded Subscriber Identity Module (eSIM) by a telecommunication network provider are described herein. The telecommunication network provider can implement an eSIM enterprise system to manage provisioning, activating, security, and testing of the eSIM. The eSIM enterprise system can activate the eSIM, update a user profile associated with the eSIM, determine a capability of the eSIM, test functionality of the eSIM, process a payment to modify the eSIM, secure communications associated with the eSIM, and determine interfaces for communicating with a variety of devices, applications, or business entities associated with the eSIM.

19 Claims, 7 Drawing Sheets

ENTERPRISE EMBEDDED SUBSCRIBER IDENTITY MODULE MANAGEMENT

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
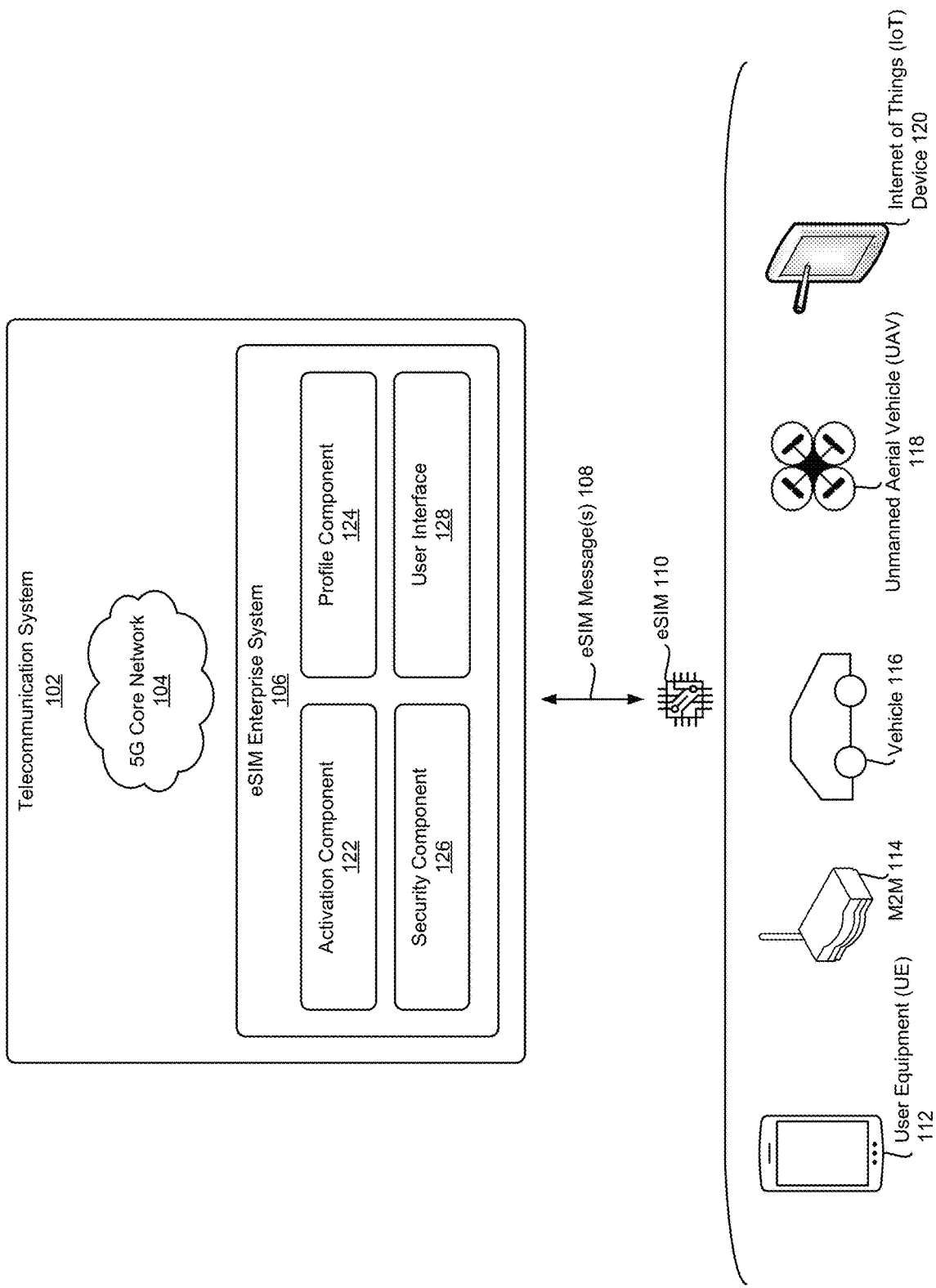
FIG. 1 depicts an example network environment in which an example telecommunication system implements an example eSIM enterprise system to engage in one or more communications with an eSIM.

This application describes techniques for activating, testing, securing, and deploying an embedded Subscriber Identity Module (eSIM). For example, the techniques can include a telecommunication network provider implementing an Enterprise system that communicates with the eSIM to manage profiles, test functionality, determine security, perform activation, and so on. The Enterprise system (e.g., a server, an Enterprise Platform) can also communicate with one or more different entities (e.g., a device in which the eSIM is embedded, a third party vendor, a business entity of the telecommunication network provider, etc.) to activate and/or make changes to the eSIM. Implementing the Enterprise system enables the telecommunication network provider to assign an eSIM to a user profile, verify regulatory compliance relating to the eSIM, and/or perform testing for the eSIM at a single location. Using the techniques described herein, the telecommunication network provider can manage an eSIM without requiring separate entities to test, secure, and/or activate the eSIM thereby saving network and processing resources.

Generally, the techniques described herein can include a server of a network provider exchanging data with an eSIM to manage provisioning, deployment, security, testing, user profile assignment, and the like. That is, the techniques enable the eSIM to be remotely updated based on a request from a user of a device (e.g., via a web site, an application, or a user interface) or automatically in response to an eSIM capable device receiving power (e.g., the eSIM can automatically and without user input send a communication to the server to initiate associating the eSIM with a user profile). The server can communicate with the eSIM directly (e.g., with functionality provided by the eSIM) and/or with one or more components of a device hosting the eSIM. In some examples, the server can send and/or receive eSIM data with a user equipment, a computing device, an Internet of Things device, a watch device, a meter (e.g., a smart utility meter, etc.), a listening device, a video camera device, a vehicle, a drone, a bicycle, a sensor, or a Machine to Machine device, just to name a few.

In some examples, a server representing an Enterprise Platform can include functionality to activate the eSIM, update a user profile associated with the eSIM, determine a capability of the eSIM, initiate a test operation to test functionality of the eSIM, process a payment, and/or identify an application program interface (API) for communicating with one or more applications (e.g., a third party application, a business entity application, an application associated with a device housing the eSIM, etc.). Provisioning an eSIM can include the server using a catalog to perform the above mentioned functionality in less time and without requiring a network to access an eSIM management provider. Additional details of the eSIM techniques employed by the server can be found throughout this disclosure including in the figures that follow.

The systems and techniques disclosed herein can manage an eSIM by employing a server, computing device(s), and/or a databases(s), etc. that collectively receive, determine, generate, and/or format eSIM data associated with the eSIM. The server may, for example, receive a request to modify an eSIM operating on a telecommunications network. In such examples, the server can receive a communication from the eSIM indicating a request to assign the eSIM to a subscriber identifier (e.g., an identity of a user of the device associated with the eSIM). The eSIM data determined by the server can include device data, user data, test data, activation data, and/or security data usable to modify the eSIM (e.g., update an association between the eSIM and a user, retrieve an eSIM deleted from a device, change a network provider, etc.). In some examples, the server can receive an order from a user to modify the eSIM and verify credit or payment before modifying the eSIM. The server may also determine a security protocol and/or a security key for exchanging the eSIM data with the eSIM (or device in which the eSIM is embedded, coupled, and/or housed). In this way, the telecommunications network provider can securely exchange profile data, order data, activation data, test data, etc. usable to update the eSIM without requiring communications with entities outside of the telecommunications network provider. By using the systems and techniques disclosed herein, one or more user profiles can be assigned to an eSIM thereby enabling a device to function with the eSIM.

FIG. 1 depicts an example network environment 100 in which an example telecommunication system implements an example eSIM enterprise system to engage in one or more communications with an eSIM. For example, a telecommunication system 102 can include one or more core network(s) 104 for an eSIM enterprise system 106 to exchange one or more eSIM messages 108 with an eSIM 110 associated with a device (e.g., a user equipment (UE) 112, a Machine to Machine device (M2M) 114, a vehicle 116, an unmanned aerial vehicle (UAV) 118, or an Internet of Things (IoT) device 120, just to name a few). Using the techniques described herein, the eSIM enterprise system 106 can exchange the eSIM message(s) 108 to update, test, activate, or otherwise modify the eSIM.

In various examples, the telecommunication system 102 can represent functionality to provide a communication session (e.g., an exchange of data) between a device having an eSIM (e.g., the eSIM 110) and the eSIM enterprise system 106, and can include one or more radio access networks (RANs), as well as one or more core networks linked to the RANs. For instance, the eSIM can wirelessly connect to a base station or other access point of a RAN, and in turn be connected to the core network(s) 104. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the telecommunication system 102 is compatible to operate with other radio technologies including those of other service providers. Accordingly, a message from the eSIM may be processed by telecommunication system 102 independent of the technology used by the eSIM.

In some examples, the core network(s) 104 can represent a service-based architecture that includes multiple types of network functions that process control plane data and/or user plane data to implement eSIM services for the device associated with the eSIM. In some examples, the services comprise the eSIM messages 108 which may include a text, a data file transfer, an image, a video, a combination thereof, and so on. The network functions of the core network(s) 104 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 4, and elsewhere.

In some examples, the eSIM message(s) 108 can include a message requesting a change to the eSIM 110 (e.g., activating the eSIM, assigning the eSIM to another subscriber, etc.). For example, the eSIM enterprise system 106 can receive a message from the eSIM 110 (or device associated therewith) requesting recovery of a deleted eSIM (e.g., data deleted from the eSIM that prevents the device from receiving service) and/or activation of the eSIM 110.

The eSIM message(s) 108 can also or instead include a test message to test operation of the eSIM prior to or after a change to the eSIM. Additional types of eSIM messages that can be exchanged with the eSIM and the eSIM enterprise system 106 are discussed throughout this disclosure.

As depicted in FIG. 1, the eSIM enterprise system 106 comprises an activation component 122, a profile componentcomponent 124, a security component 126, and a user interface 128 to implement the techniques described herein. For example, the activation component 122 can process eSIM messages relating to activating or updating an association between the eSIM 110 and a user. For example, a user profile can be associated with the eSIM 110 to identify the user of the eSIM 110. The user profile can include data representing an identity of the user, user preferences, contacts, device information, network provider information, and the like. In some examples, the activation component 122 can assign or otherwise associate an identifier of the eSIM (e.g., an International Mobile Equipment Identity (IMEI)) to an identifier of a subscriber (e.g., an International Mobile Subscriber Identity (IMSI)). In various examples, the association between a user and an eSIM, or activation, can occur after verifying a test status or performing a test of various operations performed by the eSIM.

The profile component 124 can be configured to store data such as device data describing the device hosting the eSIM, an eSIM identifier, and user data associated with a user of the device. Components of the eSIM enterprise platform 106 can communicate with each other and the profile component 124 to implement the techniques described herein. For example, the activation component 122 can receive data from the profile component 124 to determine a capability for the device to receive an instruction to modify the eSIM 110. In some examples, the activation component 122 can determine a communication capability (e.g., a type(s) of communication useable by the eSIM 110 or device), a security capability (e.g., a type of security key or protocol usable by the eSIM 110 or device), or a test capability (e.g., a type of test usable by the eSIM or device). In various examples, the activation component 122 can determine the eSIM message(s) 108 for sending to the eSIM 110 based at least in part on the one or more determined capability(ies).

Generally, the security component 126 represents functionality to secure the eSIM 110 before, during, and/or after an eSIM operation (e.g., sending a communication, receiving a communication, assigning a subscriber, performing a test, accessing data stored within the eSIM, etc.). For example, the security component 126 can be configured to determine a secure protocol, a security key, or other security information for communicating the eSIM message(s) 108 with the eSIM 110. The security component 126 can, for example, validate a security key associated with a communication, test operation, secure a payment, and so on. In various examples, the eSIM enterprise system 106 can implement a payment component (not shown) to receive and process a payment as well as determine a payment status indicating payment or credit to change the eSIM 110. In examples when the eSIM enterprise system 106 processes a payment associated with the eSIM 110, the security component 126 can implement a security protocol to receive and verify payment. The security component 126 can also monitor, verify, or otherwise determine regulatory compliance when determining or communicating data associated with the eSIM message(s) 108.

In various examples, the eSIM enterprise system 106 can determine a protocol for communicating the eSIM messages(s) 108 (e.g., an API, security protocol, communication protocol, etc.). In some examples, the eSIM messages(s) 108 can include one or more of: a transmission control protocol (TCP), an interne protocol (IP), a user datagram protocol (UDP), a simple mail transport protocol (SMTP), a file transfer protocol (FTP), a hypertext transfer protocol (HTTP), or a hypertext transfer protocol secure (HTTPS). In this way, the eSIM enterprise system 106 can communicate with a variety of device types using a variety of communication types.

The user interface 128 represents functionality for the eSIM enterprise system 106 to interface with a user of a device via one or more programmable controls that convey information and may receive input. In some examples, the user interface 128 can cause data to output on a display device of the UE 112 (or other device type) to enable the eSIM enterprise system 106 to receive payment for an eSIM change request as well as to present a status of an order. The user interface 128 may also present options for a user to initiate recovery of a deleted or non-functioning eSIM, manage profiles for multiple eSIMs by storing multiple user profiles on the eSIM 110.

In some examples, the user interface 128 can be configured to present dashboards or other data to one or more users in one or more business entities of the telecommunication system 102. An engineering team, may for instance, use the user interface 128 to send and receive data from the eSIM enterprise system 106 to identify improvements in configuring an eSIM for various devices. The user interface 128 may also provide support for troubleshooting aspects related to an order, a test, or other eSIM operation.

As mentioned, the eSIM can be associated with a variety of device types. For example, the UE 112 represents any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 112 is illustrated in greater detail in FIG. 6.

In some examples, the eSIM enterprise system 106 can exchange the eSIM messages(s) 108 with the M2M 114 using an M2M communication protocol. In such examples, the eSIM enterprise system 106 can automatically receive a message from an eSIM (or similarly configured integrated circuit) within the M2M 114, and communicate an eSIM message 108 to authorize the change to the eSIM and perform one or more tests to ensure accurate and safe data communications and functionality of the eSIM 110.

Figure 2:
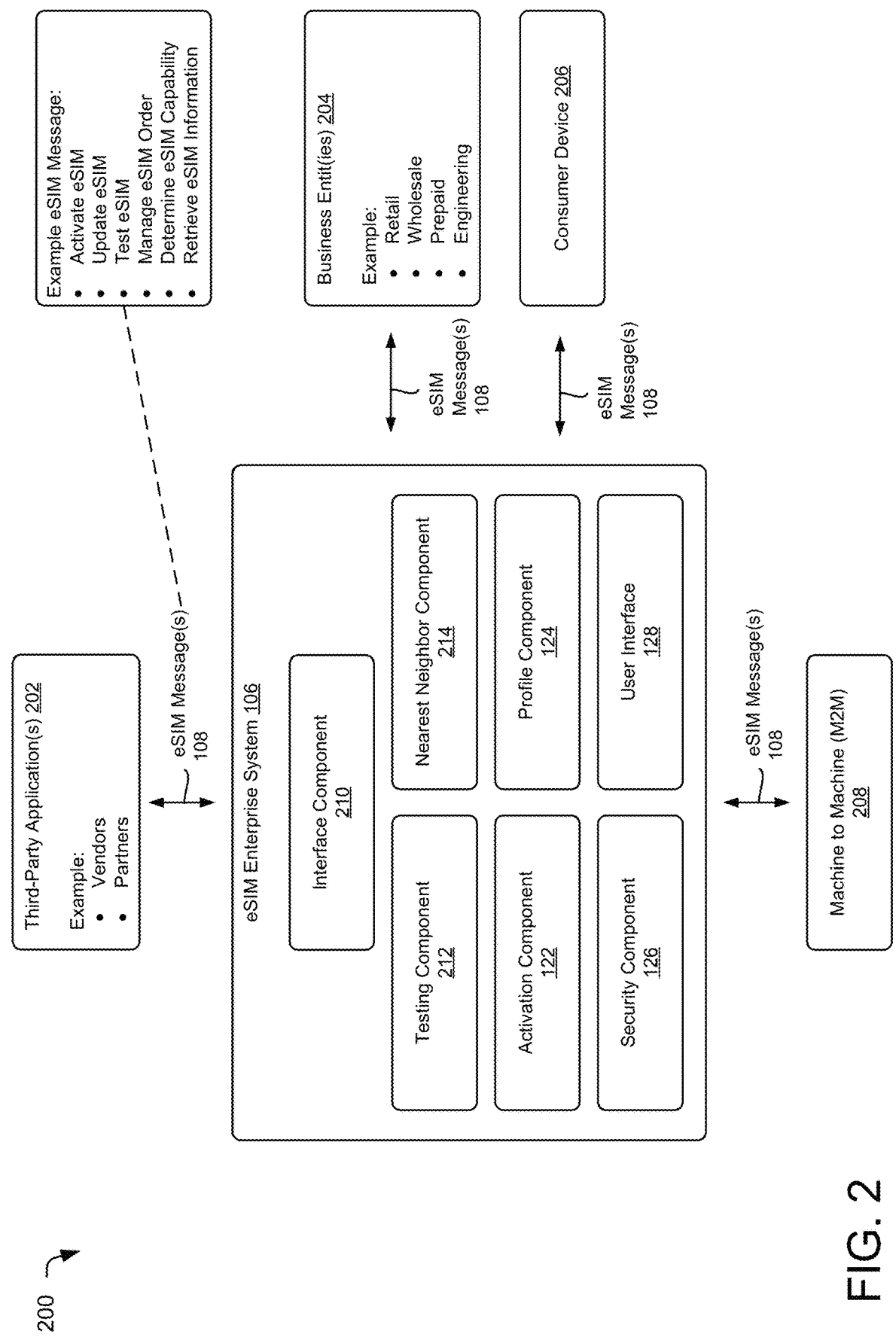
FIG. 2 depicts another example network environment in which an example telecommunication system implements an example eSIM enterprise system to engage in one or more communications with an eSIM.

FIG. 2 depicts another example network environment 200 in which an example telecommunication system implements an example eSIM enterprise system to engage in one or more communications with an eSIM. For example, the eSIM enterprise system 106 can use the core network(s) 104 to exchange one or more eSIM messages 108 with a third party application(s) 202, one or more business entities 204, a consumer device 206, and/or a Machine to Machine (M2M) 208. As shown in FIG. 2, the eSIM enterprise system 106 includes an interface component 210 for interfacing with various entities, applications, and/or devices, a testing component 212 for testing operation of the eSIM 110, and a nearest neighbor component 214.

The eSIM message(s) 108 can include any message to activate, update, and/or test an eSIM. For example, the eSIM enterprise system 106 can receive a message requesting an alteration to an eSIM from the third party application(s) 202, the one or more business entities 204, the consumer device 206 (e.g., the UE 112), and/or the M2M 208. A third party application(s) 202 associated with a vendor, a partner, or other entity outside the telecommunication system can communicate with the eSIM enterprise system 106 to identify eSIM capabilities, device information, payment verification, and so on. In some examples, the business entity can represent retail, wholesale, and/or prepaid business entities associated with the telecommunication system 102 that initiate or facilitate an eSIM order (e.g., exchange data for determining a payment to associate a user with an eSIM). In such examples, the interface component 210 can determine a protocol for sending and/or receiving the eSIM message(s) 108 given that each application or business entity can require different protocols to ensure secure communication.

The one or more business entities 204 can represent an entity of the telecommunication system 102 including, for example, retail, wholesale, prepaid, engineering, accounting, and the like. Through use of one or more components of the eSIM enterprise system 106, a business entity can exchange data (e.g., send and/or receive the eSIM data) to provide end to end ordering, testing, activation and the like throughout the lifecycle of the eSIM 110 and/or the lifecycle of a device hosting the eSIM 110 (e.g., as long as the eSIM and/or the device is operable). In some examples, the user interface 128 can be output for display on a display device associated with each business entity.

The interface component 210 can, in some examples, determine an interface type used by the entities, the applications, the eSIM and/or the device hosting the eSIM, and identify a most efficient protocol for communicating data based at least in part on the interface type. For example, the interface component 210 can determine how to connect to the third party application(s) 202, the one or more business entities 204, the consumer device 206, the M2M 208 device, and/or the eSIM 110 over the core network(s) 104. In one specific example, the interface component 210 can determine a device type from a device identifier associated with the eSIM message(s) 108 and identify a most efficient way to communicate with the particular device type from among multiple available communication types. In some examples, the interface component 210 can identify an Application Program Interface (API) associated with the eSIM message(s) 108, an application, a third party application, or other entity for exchanging eSIM data. In this way, the interface component 210 can use the API to send the eSIM message(s) 108 for activation, testing, payment, eSIM recovery, or other purposes.

Generally, the testing component 212 represents functionality to test operation of the eSIM 110 before and/or after an eSIM operation (e.g., sending a communication, receiving a communication, assigning a subscriber, activating an eSIM, etc.). For example, the testing component 212 can be configured to determine testing capabilities of the device and/or the eSIM 110 based at least in part on the device type and a device identifier, and generate, determine, or otherwise configure one or more test instructions to perform one or more tests based at least in part on the testing capabilities of the device. Accordingly, the testing component 212 can enable the telecommunications system 102 to perform test(s) without requiring that a third-party tester (or other third-part entity) be accessed over a network thereby providing the test(s) in less time versus using a network to access the third-party tester (or other third-part entity).

The nearest neighbor component 214 can represent functionality to generate, modify, or otherwise determine eSIM data (e.g., a template,) usable by the one or more components to implement the techniques described herein. For example, the nearest neighbor component 214 can represent a catalog comprising the eSIM data and can include using a nearest neighbor algorithm to access, store, generate, modify, or otherwise determine eSIM data (e.g., security data, profile data, activation data, and/or device data). In some examples, the nearest neighbor component 214 enables efficient data transfers, searches, and the like, between one or more of: the activation component 122, the profile component 124, the security component 126, the user interface 128, the interface component 210, the testing component 212, the third party application(s) 202, the one or more business entities 204, the consumer device 206, and/or the Machine to Machine (M2M) 208.

In various examples, the nearest neighbor component 214 can comprise a catalog of eSIM data for communicating with the components of the eSIM enterprise system 106, the third party application(s) 202, the one or more business entities 204, the consumer device 206, and/or the Machine to Machine (M2M) 208 via one or more APIs. The nearest neighbor component 214 can include generic attribute values to represent the eSIM data thereby enabling efficient access, transmission, and/or updating of the eSIM data regardless of which component or device communicates with the eSIM enterprise system 106. For example, the user interface 128 can receive instructions from a third-party, a business entity, a consumer device, or other entity, and send and/or receive the eSIM data to "onboard" an eSIM (e.g., activate or update the eSIM 110. By implementing the nearest neighbor component 214, the eSIM enterprise system 106 can perform ordering, testing, activating, etc. using a catalog that identifies a SIM type (e.g., single SIM, dual SIM, eSIM, etc.), a profile, and the like.

By way of example and not limitation, the nearest neighbor component 214 can receive a request to update profile data associated with an update to the eSIM 110, determine an identity of the user and/or the device associated with the eSIM 110, determine a test result, and/or process a payment before updating the profile data. In this way, the eSIM enterprise system 106 can avoid using computation resources (e.g., processor and/or memory) to create, update, or store profile data until after the nearest neighbor component 214 exchanges data to determine the identity, test result, payment, and so on.

Using the one or more components, the eSIM enterprise system 106 can provide a single point solution for eSIM management from receiving a request to alter an eSIM, determining device capabilities, generating tests, activating an eSIM, and sending data usable to activate the eSIM to a device associated with the eSIM. For example, the user interface 128 can receive a request to modify the eSIM 110, the interface component can identify how to send communications to the eSIM 110, the testing component 212 can initiate a test of the eSIM functionality, and the activation component 122 can transmit activation data to the eSIM 110 to cause the eSIM to be activated. The activation data can represent data usable by the eSIM to enable operation of the eSIM with an authorized user.

In some examples, the security component 126 can receive payment, verify payment, and/or validate credentials associated with the eSIM to authorize the user to modify the eSIM 110. Information to associate a user (e.g., a user profile, a subscriber identifier, etc.) and the eSIM 110 can be stored in the profile component 124.

The one or more components of the eSIM enterprise system 106 can send or receive data with one another based at least in part on a data structure or data model that optimizes efficiency of finding, accessing, and communicating the data. For example, the eSIM enterprise system 106 can implement the nearest neighbor component 214 having a catalog having nearest neighbor functionality to search, or "look up", data associated with each component. The catalog can comprise scripts, algorithms, definitions, or other variables to classify or exchange user data, device data, test data, payment data, third-party data, and other data based on a configurable parameter that determines a length of time and/or an amount of nearest neighbor data to search.

In some examples, the interface component 210 can receive a request to modify the eSIM 110 based on a device embedded with an eSIM scanning a Quick Response (QR) code that automatically connects the eSIM to the eSIM enterprise system 106. Additionally or alternatively, the eSIM enterprise system 106 can query a device for device information indicating whether the device includes an eSIM, and send a notification or other message to the device to initiate a potential modification of the eSIM (e.g., assign a mobile network operator, and the like).

In various examples, the eSIM enterprise system 106 can implement the interface component 210, the activation component 122, the security component 126, and/or another component communicate with the third party application(s) 202, the one or more business entities 204, the consumer device 206, and/or the Machine to Machine (M2M) 208 using an API specific for each application, business entity, consumer device, and/or M2M. For example, the eSIM enterprise system 106 can determining the API(s) based on security data (e.g., a security protocol and/or encryption that meets an enterprise standard) associated with the security component 126. In some examples, the APIs can be defined as snippets implemented as part of a codebase.

Figure 3:
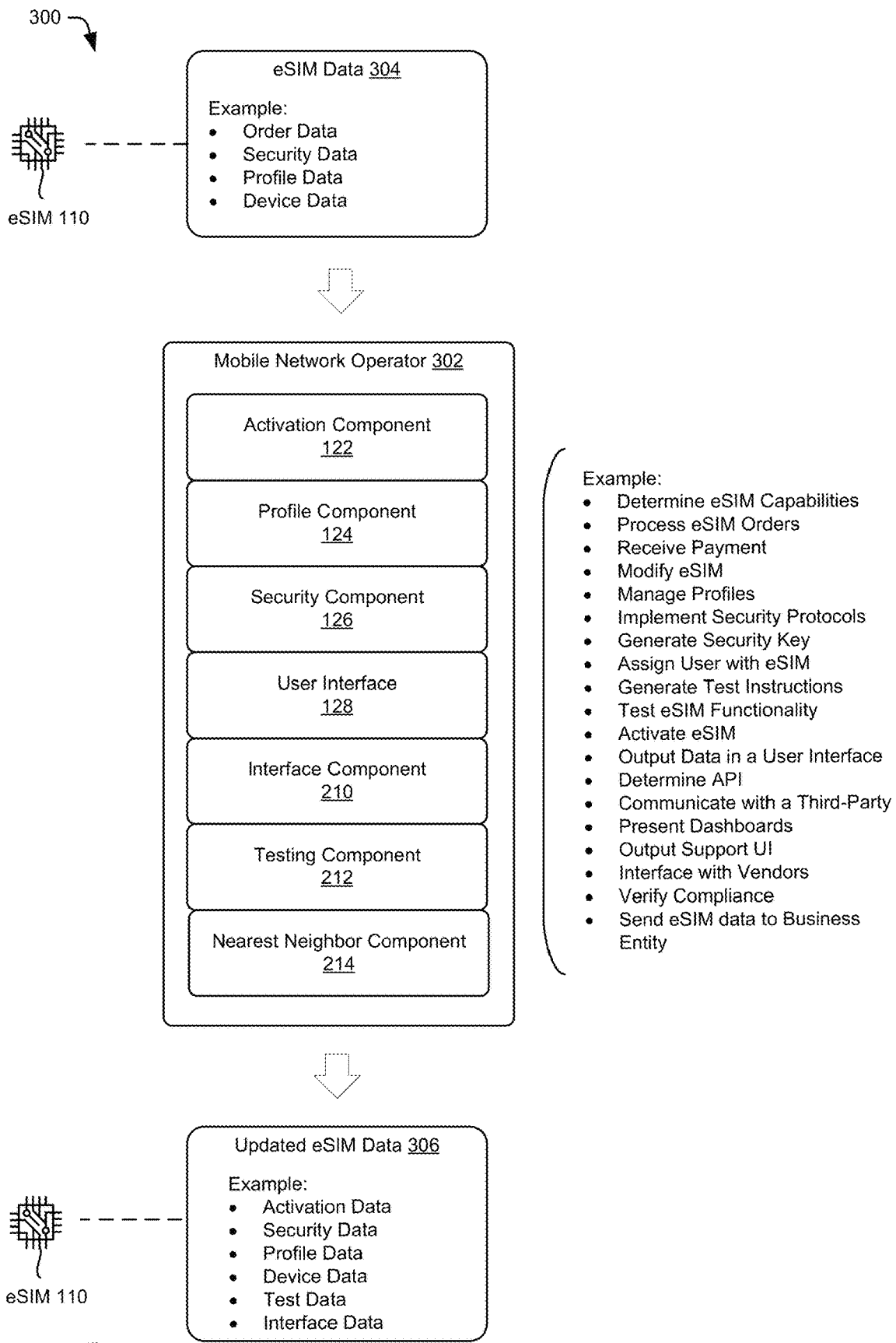
FIG. 3 depicts another example network environment in which an example mobile network provider implements an example eSIM enterprise system to engage in one or more communications with an eSIM.

FIG. 3 depicts another example network environment 300 in which an example mobile network provider implements an example eSIM enterprise system to engage in one or more communications with an eSIM. For example, a mobile network operator (MNO) 302 can include the activation component 122, the profile component 124, the security component 126, the user interface 128, the interface component 210, the testing component 212, and the nearest neighbor component 214 to receive eSIM data 304 (e.g., data associated with and/or stored on the eSIM 110) and output updated eSIM data 306 (e.g., data for storing on the eSIM 110).

As shown in FIG. 3, the MNO 302 can include various components to communicate with an entity (e.g., a business of the MNO 302 sending a request to alter the eSIM), an application (e.g., an application on a device housing the eSIM 110), and/or a device (e.g., a device housing the eSIM 110, a device used by a business entity of the MNO 302, a device using a core network associated with the MNO 302, a device registered to another MNO, etc.). In addition to the aforementioned components, additional components may be included in the MNO 302 (e.g., a payment component, and so on) to enable the MNO 302 to interface with the entity, application, and/or the device regardless of an operating system, network technology, communication interface, or security requirements employed by the entity, application, and/or the device.

The eSIM data 304 can represent one or more of: order data, security data, profile data, and device data, just to name a few. The eSIM data 304 can be associated with a communication requesting a modification to the eSIM 110 and can include payment information, security information, user information, and device information for processing by the MNO 302. For example, the MNO 302 can receive data representing a user of the device embedded with the eSIM, a security key for securing a communication, device capabilities (e.g., testing capabilities, communication technologies available, etc.), a payment request, and so on. The security data, the profile data and/or the device data can comprise one or more of: a user profile (e.g., user settings such as preferred networks during roaming, contacts, personal information, one or more eSIMs associated with the user), network operator information, a subscription, user credentials for authorization, an international mobile subscriber identity (IMSI), an integrated circuit card identifier (ICCID), a security algorithm, a security key, third-party applications (consumer, supplier, etc.), and so on.

The MNO 302 can perform a variety of operations based at least in part on the eSIM data 304 including one or more of: determining eSIM capabilities, initiating and completing an order to modify the eSIM, receiving payment, reassigning an eSIM, activating an eSIM, recovering an eSIM, managing a user profile (e.g., an association between a user and an eSIM), detecting and determining security protocols, generating a security key, generating test instructions, testing eSIM functionality, generating data for output in a user interface, determining an API, communicating with a Third-Party, presenting dashboard(s), providing support interfaces to one or more devices associated with the eSIM, verifying device compliance for eSIM activities, verifying Mobile Network Operator compliance for eSIM activities, exchange data with a business entity, and so on. Based at least in part on performing the one or more operations, the MNO 302 can determine the updated eSIM data 306 for sending to the eSIM 110.

The updated eSIM data 306 determined by the MNO 302 can represent data responding to a communication from the eSIM 110. In some examples, the eSIM 110 can automatically send eSIM capability data to the MNO 302 which in turn can send a notification to the device associated with the eSIM to initiate a modification of the eSIM. In this way, a user of the device can be made aware of options to program the eSIM to switch mobile network operators, such as receiving service from the MNO 302. Generally, the updated eSIM data 306 can include activation data, security, data, profile data, test data, or interface data, though other data types are also contemplated. For instance, the updated eSIM data 306 can include a security key, an authorization status, a payment status, a test status, test instructions (e.g., a program that runs on the eSIM to test operation of the eSIM), confirmation of an association between a user/subscriber and the eSIM, one or more APIs, data for output in a user interface to facilitate payment for an eSIM modification, etc.

By including a variety of operations at the MNO 302, fewer network communications are needed to provision the eSIM 110 which saves computational resources, (e.g., an amount of memory, a frequency of memory access, an amount of processor operations, a processor speed, and the like). Further, the MNO 302 can employ a catalog using a nearest neighbor technology (or other efficient data management structure) to minimize use of the computational resources by the eSIM enterprise system 106 to process, generate, access, or determine the eSIM data 304 and/or the updated eSIM data 306. For example, the eSIM enterprise system 106 can reduce latency when making determinations by employing the catalog and aforementioned components. In some examples, the eSIM enterprise system 106 can make determinations in less time and using fewer computation resources (e.g., fewer processor operations, less memory access, less memory requirements) versus typical mobile network providers that utilize third-party billing, testing, and/or security providers.

In addition, the eSIM enterprise system 106 can monitor, verify, and otherwise determine compliance with a regulatory requirement associated with storing, securing, testing, communicating, and/or generating the eSIM data 304 and/or the updated eSIM data 306 to ensure that the operations performed by the eSIM enterprise system 106 meets current regulatory requirements. For instance, the eSIM enterprise system 106 can send a report to a device of a regulatory agency showing ways the system is able to securely manage the eSIM 110.

Figure 4:
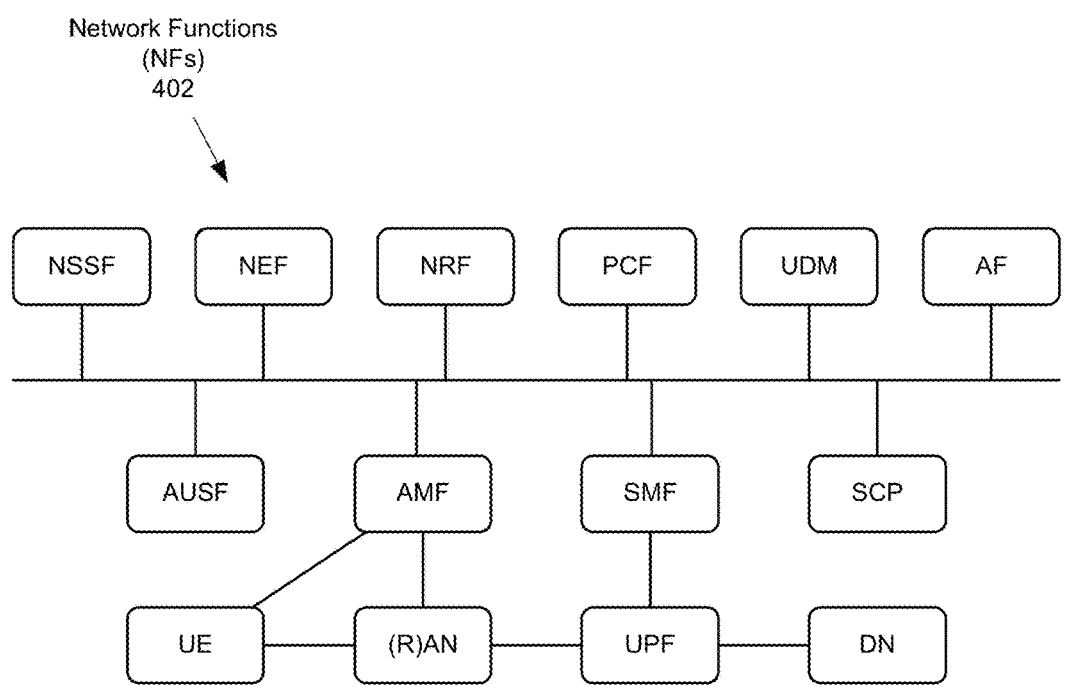
FIG. 4 depicts an example system architecture for a fifth generation (5G) telecommunication network.

FIG. 4 depicts an example system architecture for a fifth generation (5G) telecommunication network. In some examples, the telecommunication network can comprise the core network(s) 104 in FIG. 1 that includes a service-based system architecture in which different types of network functions (NFs) 402 operate alone and/or together to implement services. Standards for 5G communications define many types of NFs 402 that can be present in 5G telecommunication networks (e.g., the core network 104), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP Inter-Working Function (N3IWF), Trusted Non-3GPP Gateway Function (TNGF), and Wireline Access Gateway Function (W-AGF), many of which are shown in the example system architecture of FIG. 4.

One or more of the NFs 402 of the core network(s) 104 can be implemented as network applications that execute within containers (not shown). 5G NFs 402 can execute as hardware elements, software elements, and/or combinations of the two within telecommunication network(s), and accordingly many types of 5G NFs 402 can be implemented as software and/or as virtualized functions that execute on cloud servers or other computing devices. Network applications that can execute within containers can also include any other type of network function, application, entity, module, element, or node.

Figure 5A:
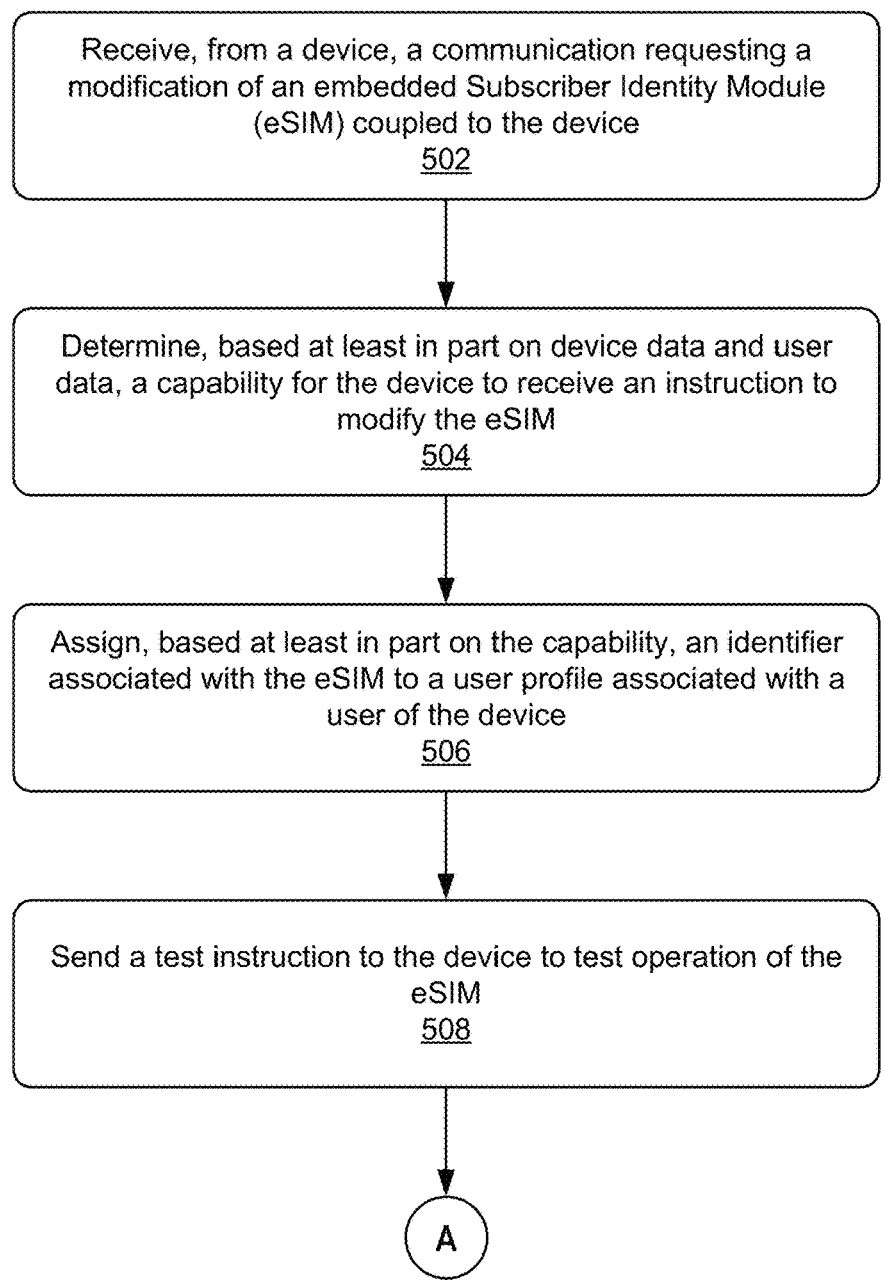
FIG. 5A is a first part of a flowchart depicting an example process for modifying an example eSIM by an example eSIM enterprise system.

FIG. 5A is a first part of a flowchart depicting an example process 500 for modifying an example eSIM by an example eSIM enterprise system. Some or all of the process 500 may be performed by one or more components in FIGS. 1-4, as described herein. For example, some or all of process 500 may be performed by the eSIM enterprise system 106 associated with the telecommunication system 102.

At operation 502, the process may include receiving, from a device, a communication requesting a modification of an embedded Subscriber Identity Module (eSIM) coupled to the device. In some examples, the operation 502 may include the eSIM enterprise system 106 receiving a communication (e.g., the eSIM message(s) 108) from a device associated with the eSIM 110, a device associated with a business entity of the telecommunication system 102, an M2M (e.g., the M2M 208), and/or a component of the eSIM. The modification request included in the communication can represent a request to update a user profile, activate the eSIM, test the eSIM, recover eSIM data, associate a subscriber identifier with an eSIM identifier, verify credit for the modification, etc.

By way of example and not limitation, the UE 112 can send a request to change assignment of an eSIM to the eSIM enterprise system 106. In such examples, the eSIM enterprise system 106 can implement to the security component 126 to secure the communication using a protocol, a key, or other security technique. The activation component 122 can authorize the user of the device, verify payment, or determine whether to test the eSIM using the test component 212.

In some examples, the operation 502 can include a retail, wholesale, or pre-paid business entity (or other business entity type) sending the communication on behalf of the user and based at least in part on the user initiating a request to modify the eSIM with the respective business entity. The eSIM enterprise system 106 can cause a user interface to present data on a display device of one of the aforementioned devices to present service options and receive an input from the user. In various examples, the eSIM enterprise system 106 can receive the communication via an application based at least in part on using an API determined by the interface component 210.

At operation 504, the process may determining, based at least in part on device data and user data, a capability for the device to receive an instruction to modify the eSIM. In some examples, the operation 504 may include the activation component 122 retrieving, identifying, or accessing the user data and the device data from the profile component 124 and/or from data associated with the communication to determine whether the device has a communication capability to communicate with the eSIM, a testing capability to receive a test instruction, or current credit to receive the instruction to modify the eSIM. For instance, the activation component 122 can, based on receiving a request to assign the eSIM 110 to a subscriber identifier of the user, authorize the user, verify payment, determine device communication capabilities, and the like, based on the user data and the device data.

At operation 506, the process may include assigning, based at least in part on the capability, an identifier associated with the eSIM to a user profile associated with a user of the device. In some examples, the operation 506 may include the activation component 122 assigning a unique identifier of the eSIM to a subscriber identifier associated with the user. In one non-limiting example, the activation component 122 can associate an International Mobile Subscriber Identity (IMSI) of the user and an International Mobile Equipment Identity (IMEI) of the device in the profile component 124 as a user profile. The user profile may be a new profile linking the user and the eSIM, or an update to an existing user profile stored in the profile component 124. The data associated with the user profile can include a device identifier, an eSIM identifier, a subscriber identifier, subscription information, testing information, and the like.

At operation 508, the process may include sending a test instruction to the device to test operation of the eSIM. In some examples, the operation 508 may include the test component 212 generating, determining, or otherwise configuring one or more test instructions to perform one or more tests based at least in part on the testing capabilities of the device and/or available to the eSIM. The eSIM enterprise system 106 can transmit the test instruction(s) to the device associated with the eSIM 110 to cause a test relating to one or more of: security, an executable command, an output, or a communication performed or determined by the device and/or the eSIM.

In some examples, the test component 212 can store a test status for each test completed or scheduled for completion in a test log. In some examples, the test component 212 can verify that a test associated with the test instruction has previously completed and therefore may not be needed. In such examples, the test component 212 can omit transmitting the test instruction based on the test status indicating that security or functionality of the eSIM has already completed within a previous predetermined time period.

Figure 5B:
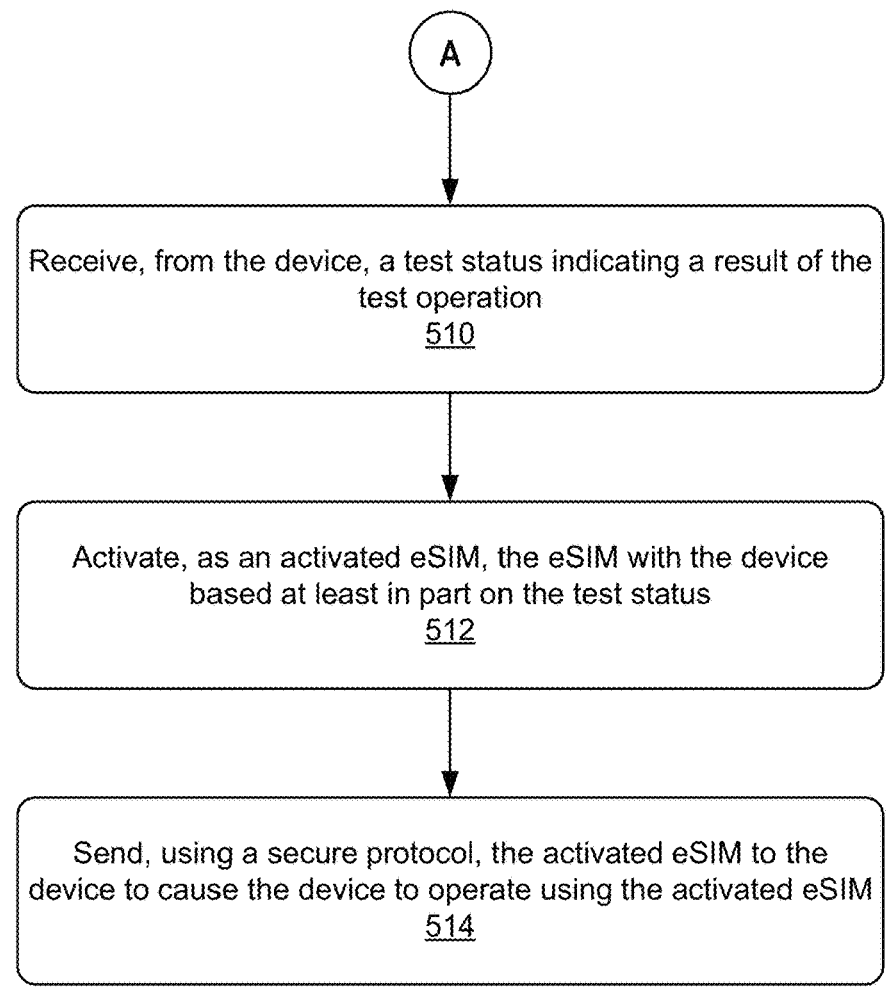
FIG. 5B is a second part of the flowchart depicting the example process for modifying an example eSIM by an example eSIM enterprise system.

FIG. 5B is a second part of the flowchart depicting the example process for modifying an example eSIM by an example eSIM enterprise system.

At operation 510, the process may include receiving, from the device, a test status indicating a result of the test operation. In some examples, the operation 510 may include the eSIM enterprise system 106 receiving the test status based on the test instruction being transmitted to the device, however, in other examples, the test status may be received from the profile component 124 which stores a test status for all past, current, and future tests associated with the eSIM.

At operation 512, the process may include activating, as an activated eSIM, the eSIM with the device based at least in part on the test status. In some examples, the operation 512 may include the activation component 122 receiving an indication from the test component 212 that the eSIM successfully passed the one or more tests, an indication of payment from the security component (and/or payment component), etc. and activate the eSIM (associate the user with an operable eSIM) based on the received indication(s).

At operation 514, the process may include sending, using a secure protocol, the activated eSIM to the device to cause the device to operate using the activated eSIM. In some examples, the operation 514 may include the activation component 122 determining activation data to cause the eSIM to operate with an assigned and authorized user, and sending the activation data to the eSIM to cause the device to execute scripts, programs, etc. In some examples, the operation 514 can include the security component 126 determining a security protocol for communicating the activation data based at least in part on security capabilities of the device and/or the eSIM. The eSIM can execute the activation data to enable the device to use one or more services from the telecommunication system 102 such as accessing an application or completing a call or text, for example.

In various examples, process 500 may return to operation 502 or operation 508 after performing operation 514. FIGS. 5A and 5B illustrate example processes in accordance with examples of the disclosure. These processes are illustrated as logical flow graphs, each operation of which represents a sequence of operations that can be implemented in hardware, software, or a combination thereof. The order in which the operations are described is not intended to be construed as a limitation, and any number of the described operations can be omitted and/or combined in any order and/or in parallel to implement the processes.

Figure 6:
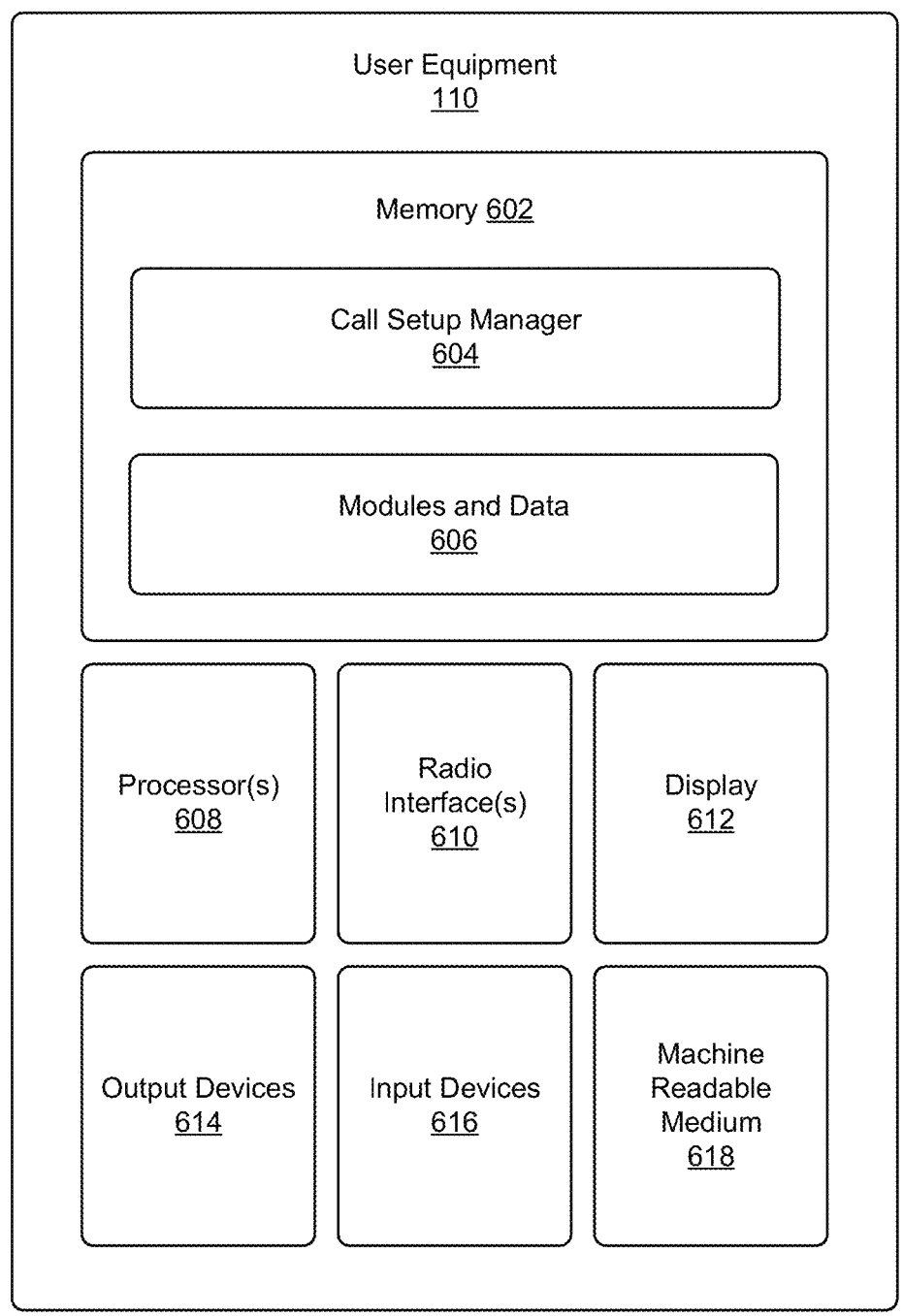
FIG. 6 depicts an example system architecture for a user equipment.

FIG. 6 depicts an example system architecture for a UE 112, in accordance with various examples. As shown, a UE 112 can have memory 602 storing a call setup manager 604, and other modules and data 606. A UE 112 can also comprise processor(s) 608, radio interfaces 610, a display 612, output devices 614, input devices 616, and/or a machine readable medium 618.

In various examples, the memory 602 can include system memory, which may be volatile (such as RAM), non-volatile (such as ROM, flash memory, etc.) or some combination of the two. The memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 112. Any such non-transitory computer-readable media may be part of the UE 112.

The call setup manager 604 can send and/or receive messages comprising an eSIM service including determining a communication interface for communicating with the eSIM enterprise system 106. The call setup manager 604 can configure SIP messages or other forms of communication comprising one or more of: a transmission control protocol (TCP), an internet protocol (IP), a user datagram protocol (UDP), a simple mail transport protocol (SMTP), a file transfer protocol (FTP), a hypertext transfer protocol (HTTP), or a hypertext transfer protocol secure (HTTPS).

The other modules and data 606 can be utilized by the UE 112 to perform or enable performing any action taken by the UE 112. The modules and data 606 can include a UE platform, operating system, and applications, and data utilized by the platform, operating system, and applications.

In various examples, the processor(s) 608 can be a central processing unit (CPU), a graphics processing unit (GPU), or both CPU and GPU, or any other type of processing unit. Each of the one or more processor(s) 608 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 608 may also be responsible for executing all computer applications stored in the memory 602, which can be associated with common types of volatile (RAM) and/or nonvolatile (ROM) memory.

The radio interfaces 610 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 610 can be compatible with multiple radio access technologies, such as 5G radio access technologies and 4G/LTE radio access technologies. Accordingly, the radio interfaces 610 can allow the UE 112 to connect to the telecommunication system 102 and/or the mobile network operator 302 described herein.

The display 612 can be a liquid crystal display or any other type of display commonly used in UEs 110. For example, display 612 may be a touch-sensitive display screen, and can then also act as an input device or keypad, such as for providing a soft-key keyboard, navigation buttons, or any other type of input. The output devices 614 can include any sort of output devices known in the art, such as the display 612, speakers, a vibrating mechanism, and/or a tactile feedback mechanism. Output devices 614 can also include ports for one or more peripheral devices, such as headphones, peripheral speakers, and/or a peripheral display. The input devices 616 can include any sort of input devices known in the art. For example, input devices 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 608, and/or radio interface(s) 610 during execution thereof by the UE 112. The memory 602 and the processor(s) 608 also can constitute machine readable media 618.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system implemented by a telecommunications network provider, the system comprising:
an activation component to assign an identifier associated with an embedded Subscriber Identity Module (eSIM) to a subscriber identifier;
a profile component to store device data associated with a device and user data associated with a user of the device;
a security component to determine a secure protocol for communicating with the eSIM;
a testing component to test operation of the eSIM;
one or more processors; and
one or more non-transitory computer-readable media storing instructions executable by the one or more processors, wherein the instructions, when executed, cause the system to perform operations comprising:
receiving, from the device, a communication requesting a modification of the eSIM coupled to the device, wherein receiving the communication comprises receiving the communication from a first application of the device based at least in part on a first Application Programming Interface (API);
accessing the device data or the user data from the profile component based at least in part on a second API different from the first API;
determining, based at least in part on the device data and the user data, a capability for the device to receive an instruction to modify the eSIM;
assigning, based at least in part on the capability, the identifier associated with the eSIM to the subscriber identifier;
determining a test instruction to test operation of the eSIM;
activating, as an activated eSIM, the eSIM with the device based at least in part on a result of the test operation; and
sending the activated eSIM to the device using the secure protocol to cause the device to operate using the activated eSIM.

2. The system of claim 1, further comprising a user interface configured to present information associated with the eSIM, and the operations further comprising:
causing the user interface to present data associated with one or more of: an order status, a payment status, the result of the test operation, or the capability; and
outputting, by the user interface, one or more controls to update the data.

3. The system of claim 1, the operations further comprising:
authorizing the user of the device; and
updating the user data or the device data to indicate that the device is authorized to receive the instruction to modify the eSIM,
wherein determining the capability for the device to receive the instruction to modify the eSIM is further based at least in part on the updating.

4. The system of claim 1, further comprising an interface component to communicate with one or more of: a first application associated with a business entity of the telecommunications network provider, a second application associated with an eSIM vendor, or a third application associated with another telecommunications provider, and the operations further comprising:
identifying the first API as an API associated with the communication; and
sending the activated eSIM to the first application, the second application, or the third application using the first API.

5. The system of claim 1, wherein assigning the identifier of the eSIM on the device to the subscriber identifier comprises:
associating an International Mobile Subscriber Identity (IMSI) of the user and an International Mobile Equipment Identity (IMEI) of the device in the profile component.

6. The system of claim 1, wherein the communication requesting the modification of the eSIM comprises a request to recover eSIM data deleted from the eSIM, and the operations further comprise:
determining the identifier of the eSIM associated with the communication;
accessing user profile data associated with eSIM from the profile component based at least in part on the identifier of the eSIM; and
sending recovery data including the activated eSIM to the device.

7. The system of claim 1, wherein the device data indicates a device type and a device identifier, and the operations further comprise:
determining testing capabilities of the device based at least in part on the device type and the device identifier; and
configuring the test instruction to perform one or more tests based at least in part on the testing capabilities of the device.

8. The system of claim 1, wherein the device data indicates a device type and a device identifier, and the operations further comprise:
determining testing capabilities of the device based at least in part on the device type and the device identifier; and
configuring the test instruction to perform one or more tests based at least in part on the testing capabilities of the device.

9. The system of claim 1, wherein:
the device comprises a mobile device, a computing device, an Internet of Things device, a watch device, a meter, a listening device, a video camera device, a vehicle, a drone, a bicycle, a sensor, or a Machine to Machine device, and
the modification comprises an update, a profile retrieval, or an activation of the eSIM.

10. A method comprising:
receiving, from a device, a communication requesting a modification of an embedded Subscriber Identity Module (eSIM) coupled to the device, wherein receiving the communication comprises receiving the communication from a first application of the device based at least in part on a first Application Programming Interface (API);
accessing device data associated with the device or user data associated with a user of the device from a profile component based at least in part on a second API different from the first API;
determining, based at least in part on device data and user data, a capability for the device to receive an instruction to modify the eSIM;

assigning, based at least in part on the capability, an identifier associated with the eSIM to a user profile associated with a user of the device;

sending a test instruction to the device to test operation of the eSIM;

receiving, from the device, a test status indicating a result of the test operation;

activating, as an activated eSIM, the eSIM with the device based at least in part on the test status; and sending, using a secure protocol, the activated eSIM to the device to cause the device to operate using the activated eSIM.

11. The method of claim 10, further comprising:

causing a user interface to present one or more of: an order status, a payment status, the test status, or the capability of the device; and outputting, by the user interface, one or more controls to update the payment status or the test status.

12. The method of claim 10, further comprising:

authorizing the user of the device; and updating the user data or the device data to indicate that the device is authorized to receive the instruction to modify the eSIM, wherein determining the capability for the device to receive the instruction to modify the eSIM is further based at least in part on the updating.

13. The method of claim 10, wherein the communication is received from one of: a first application associated with a business entity of a first telecommunications network provider, a second application associated with an eSIM vendor, or a third application associated with a second telecommunications provider, and further comprising:

identifying the first API as an API associated with the communication; and sending the activated eSIM to the first application, the second application, or the third application using the API.

14. The method of claim 10, wherein assigning the identifier of the eSIM on the device to the user profile comprises:

associating an International Mobile Subscriber Identity (IMSI) of a user of the device and an International Mobile Equipment Identity (IMEI) of the device in a profile component.

15. The method of claim 10, wherein the device data indicates a device type and a device identifier, and further comprising:

determining testing capabilities of the device based at least in part on the device type and the device identifier; and configuring the test instruction to perform one or more tests based at least in part on the testing capabilities of the device.

16. One or more non-transitory computer-readable media storing instructions executable by one or more processors, wherein the instructions, when executed, cause the one or more processors to perform operations comprising:

receiving, from a device, a communication requesting a modification of an embedded Subscriber Identity Module (eSIM) coupled to the device, wherein receiving the communication comprises receiving the communication from a first application of the device based at least in part on a first Application Programming Interface (API);

accessing device data associated with the device or user data associated with a user of the device from a profile component based at least in part on a second API different from the first API;

determining, based at least in part on device data and user data, a capability for the device to receive an instruction to modify the eSIM;

assigning, based at least in part on the capability, an identifier associated with the eSIM to a user profile associated with a user of the device;

sending a test instruction to the device to test operation of the eSIM;

receiving, from the device, a test status indicating a result of the test operation;

activating, as an activated eSIM, the eSIM with the device based at least in part on the test status; and sending, using a secure protocol, the activated eSIM to the device to cause the device to operate using the activated eSIM.

17. The one or more non-transitory computer-readable media of claim 16, the operations further comprising:

causing a user interface to present one or more of: an order status, a payment status, the test status, or the capability of the device; and outputting, by the user interface, one or more controls to update the payment status or the test status.

18. The one or more non-transitory computer-readable media of claim 16, the operations further comprising:

authorizing the user of the device; and updating the user data or the device data to indicate that the device is authorized to receive the instruction to modify the eSIM, wherein determining the capability for the device to receive the instruction to modify the eSIM is further based at least in part on the updating.

19. The one or more non-transitory computer-readable media of claim 16, wherein assigning the identifier of the eSIM on the device to the user profile comprises:

associating an International Mobile Subscriber Identity (IMSI) of the user and an International Mobile Equipment Identity (IMEI) of the device in a profile component.

* * * * *